United States Patent
Guichard et al.

(10) Patent No.: US 8,394,262 B2
(45) Date of Patent: Mar. 12, 2013

(54) HYDRODEMETALLIZATION AND HYDRODESULPHURIZATION CATALYSTS, AND USE IN A SINGLE FORMULATION IN A CONCATENATED PROCESS

(75) Inventors: Bertrand Guichard, Rives (FR); Denis Guillaume, Vienne (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 503 days.

(21) Appl. No.: 12/640,215

(22) Filed: Dec. 17, 2009

(65) Prior Publication Data

US 2010/0155301 A1   Jun. 24, 2010

(30) Foreign Application Priority Data

Dec. 18, 2008  (FR) ..................... 08 07269

(51) Int. Cl.
C10G 45/08 (2006.01)
B01J 23/85 (2006.01)
B01J 23/882 (2006.01)
B01J 23/883 (2006.01)

(52) U.S. Cl. ............. 208/216 R; 208/210; 208/216 PP; 208/217; 208/251 H; 502/315; 502/316

(58) Field of Classification Search .................. 208/210, 208/216 R, 216 PP, 217, 251 H; 502/315, 502/316
See application file for complete search history.

(56) References Cited

U.S. PATENT DOCUMENTS

| 4,003,828 A * | 1/1977 | Eberly, Jr. ................ 208/251 H |
| 5,320,741 A | 6/1994 | Johnson et al. |
| 6,306,287 B1 | 10/2001 | Billon et al. |
| 2004/0055934 A1 | 3/2004 | Tromeur et al. |
| 2006/0060510 A1 | 3/2006 | Bhan |
| 2007/0175797 A1 | 8/2007 | Iki et al. |
| 2008/0223755 A1* | 9/2008 | Roy-Auberger et al. ..... 208/134 |

FOREIGN PATENT DOCUMENTS

| EP | 0 450 997 | 10/1991 |
| EP | 0 565 205 A1 | 10/1993 |
| EP | 1 600 491 | 11/2005 |
| EP | 1 775 019 A1 | 4/2007 |
| FR | 2 764 211 A1 | 12/1998 |
| WO | WO-02 48288 | 6/2002 |

OTHER PUBLICATIONS

Search Report of FR 0807269 (Nov. 4, 2009).
International Search Report for FR-0 807 270 dated Jun. 3, 2009.
Rana et al., "A review of recent advances on process technologies for upgrading of heavy oils and residua," Fuel, IPC Science and Technology Press, Jan. 26, 2007, vol. 86, No. 9, pp. 1261-1231.
Inst Francais Du Petrole, "Process for hydrotreament of petroleum residue or heavy oil for refining and conversion to lighter fractions," Espacenet, Publication Date: Oct. 9, 1991; English Abstract of EP-0 450 997.
Elf Antar France, "Procede de preparation de catalyseurs d'hydrotraitement," Espacenet, Publication Date: Dec. 11, 1998; English Abstract of FR-2 764 211.

* cited by examiner

Primary Examiner — Randy Boyer
(74) Attorney, Agent, or Firm — Millen, White, Zelano & Branigan, P.C.

(57) ABSTRACT

The invention describes a catalyst comprising at least one metal from group VIB, at least two metals from group VIII termed the major promoter VIII-1 and co-promoters VIII-i, where i is in the range 2 to 5, and at least one support constituted by a porous refractory oxide, in which the elements from group VIII are present in proportions defined by the atomic ratio [VIII-1/(VIII-1+ . . . +VIII-i)], said ratio being in the range 0.5 to 0.85, as well as a process for the hydrotreatment of heavy hydrocarbon feeds, comprising at least one hydrodemetallization step and at least one hydrodesulphurization step, and employing a catalyst in accordance with the invention with an identical atomic ratio in each of the hydrodemetallization and hydrodesulphurization steps.

22 Claims, No Drawings

HYDRODEMETALLIZATION AND HYDRODESULPHURIZATION CATALYSTS, AND USE IN A SINGLE FORMULATION IN A CONCATENATED PROCESS

CROSS REFERENCE TO RELATED APPLICATION

This application may be related to Assignees co-pending application PET-2575 entitled "Hydrocracking Process Including Switchable Reactors With Feedstocks Containing 200 PPM By Weight-2% By Weight Of Asphaltenes" incorporated by reference herein.

The hydrotreatment of hydrocarbon feeds such as sulphur-containing oil cuts is gaining rapidly in importance in the refining industry as the requirement to reduce the quantity of sulphur in oil cuts increases and the need to convert heavy fractions (with a boiling point of more than 370° C.) into lighter upgradeable fractions for use as fuels increases. In view of the standards imposed by each state for commercial fuels, it is in fact necessary to upgrade as much as possible imported crudes which contain ever-increasing proportions of heavy fractions and heteroatoms and ever-decreasing proportions of hydrogen.

Two types of hydrotreatment processes can be used to treat heavy feeds such as atmospheric residues (AR) or vacuum residues (VR):
 fixed bed processes;
 ebullated bed processes.

The skilled person is aware that, by bringing a hydrocarbon feed into contact with a catalyst with properties, in terms of metals and porosity, which have been well defined, catalytic hydrotreatment can substantially reduce its quantities of asphaltenes, metals, sulphur and other impurities while improving the hydrogen to carbon ratio (H/C) while transforming it to a greater or lesser extent into lighter cuts.

Fixed bed processes result in high refining performances (production of 370° C.+ cuts with less than 0.5% by weight of sulphur and containing less than 20 ppm of metals) starting from a feed containing up to 5% by weight of sulphur and up to 100 to 150 ppm of metals Ni+V. The various effluents obtained thereby can act as bases for the production of high quality fuels, gas oil and gasoline, or feeds for other units such as fluid catalytic cracking. Beyond that metals content, the first catalytic beds are known to become rapidly deactivated due to the substantial deposition of the metals which are produced. In order to compensate for such deactivation, the temperature is thus increased. However, that increase in temperature favours the deposition of coke, accelerating the processes of intragranular clogging (plugging of the pores of the catalyst) and extragranular clogging (plugging of the catalytic bed). With such higher metals contents in the feed, then, ebullated bed processes are preferred.

For feeds which do not exceed this threshold value for the metals content, deactivation and the pressure drop can be limited by using a HYVAHL-F hydrotreatment process (U.S. Pat. No. 5,417,846 and FR-2 681 871) which comprises one or more fixed bed hydrodemetallization zones preceded by at least two hydrodemetallization guard zones (A) and (B), also with fixed beds, disposed in series for use in a cyclic manner consisting of successive repetition of steps b) and c) defined below. The process comprises the following steps: a) a step in which the guard zones are used all together (series operation) for a period which is at most equal to the deactivation and/or clogging time of one of them; b) a step during which the deactivated and/or clogged guard zone is short-circuited and the catalyst it contains is regenerated and/or replaced by fresh catalyst, and c) a step during which the guard zones (A) and (B) are used all together, the guard zone wherein the catalyst has been replaced with fresh catalyst during the preceding step being reconnected and said step being carried out for a period which is at most equal to the deactivation time and/or the clogging time of one of the guard zones. That process for hydrotreatment of a heavy hydrocarbon fraction is characterized by its fixed bed technology and the fact that it is constituted by at least two steps. The first step, termed hydrodemetallization, consist of passing the hydrocarbon feed and hydrogen over a hydrodemetallization catalyst distributed in the two guard zones, tamed "swing reactors", the function of which was described above. The subsequent second step, termed hydrodesulphurization, consists of passing the product from the first step and hydrogen over a hydrodesulphurization catalyst.

For such a process, specific catalysts which are adapted for each step are usually used under moderate operating conditions, i.e. pressures which are generally in the range 3 MPa to 30 MPa and temperatures which are generally in the range 320° C. to 450° C. Catalysts which are usually employed in the hydrotreatment processes are composed of a support on which metallic oxides are deposited, such as cobalt, nickel or molybdenum oxides. The catalyst is then sulphurized to transform all or a portion of the metallic oxides into metallic sulphide phases. The support is generally alumina-based, its role consisting of dispersing the active phase and having a texture and porosity which is suitable for good capture of the metallic impurities while avoiding the problems of clogging mentioned above.

The problem posed by fixed bed catalytic hydrotreatment of such feeds arises from the fact that during reactions for hydrotreatment of oil fractions containing organometallic complexes, the majority of such complexes are destroyed in the presence of hydrogen, hydrogen sulphide and a hydrotreatment catalyst. The constituent metal of such complexes then precipitates in the form of a solid sulphide which binds to the internal surface of the pores. This is particularly the case with complexes of vanadium, nickel, iron, sodium, titanium, silicon and copper which are naturally present in crudes to a greater or lesser extent depending on the origin of the oil and which, during distillation operations, tend to become concentrated in the high boiling point fractions and in particular in residues. This is also the case with liquefied coal which also comprises metals, in particular iron and titanium. The term hydrodemetallization (HDM) is used to designate these reactions which destroy organometallic complexes in the hydrocarbons. Coke deposits also add to the deposition of such impurities, and then the whole system tends to deactivate and rapidly clog the catalytic system. The mouths of the pores are obstructed more quickly than their other parts, which goes hand in hand with a reduction in their diameter and generates an increased limitation to the diffusion of molecules and an accentuation of the concentration gradient from the periphery to the interior of the pores to the point where deposition of the coke fairly rapidly leads to complete obstruction of the pores. These phenomena result in stoppages to replace the solids and to over-consumption of catalyst which the skilled person will want to minimize.

Hydrotreatment processes of this type of feed as well as the catalysts which are charged into them must thus be selected so that the operation cycle is as long as possible without stoppages to the unit.

For the hydrodemetallization step which will hereinafter be termed (HDM), the ideal catalyst must be capable of treating feeds which may be rich in asphaltenes, while having a high demetallizing power associated with a high capacity to retain metals and a high resistance to coking, linked to its hydrogenating power. The denomination HDM encompasses operations for eliminating vanadium, and also nickel and to a lesser extent iron.

Bimodal catalysts which can produce high HDM yields have been described in U.S. Pat. No. 5,221,656 or in U.S. Pat. Nos. 5,827,421 and 5,622,616, which implementations employ an ebullated bed mode. The bimodal support is constituted by two clearly distinct pore modes. The first mode is centred on 11-13 nm and corresponds to approximately 70% of the total pore volume. The second mode corresponds to macropores and constitutes approximately 30% of the total pore volume. The advantage of such a pore distribution is also brought to the fore in U.S. Pat. Nos. 5,089,463 and 7,119,045. U.S. Pat. No. 5,089,463 describes a catalyst with a first mode at approximately 16 nm, while U.S. Pat. No. 7,119,045 discloses a support the first mode of which is located in the range 4 to 17 nm.

The initial active phase of the catalyst placed in the hydrodemetallization step is generally constituted by nickel and molybdenum. This active phase, which is known to be more hydrogenating than a phase constituted by cobalt and molybdenum, can limit the formation of coke in the pores and thus limits its deactivation.

For the hydrodesulphurization step, which is hereinafter termed (HDS), the catalyst has to have a high hydrogenolyzing potential in order to carry out intense refining of the products: desulphurization, continued demetallization, reducing the Conradson Carbon Residue (CCR) and the asphaltenes content. Such a catalyst is characterized by a low macroporosity.

U.S. Pat. No. 6,589,908 describes a catalyst with a low macroporosity, i.e. a proportion of the pore volume in pores with a diameter of more than 350 Å, of less than 5% of the total pore volume. Further, in U.S. Pat. No. 4,818,743, the pore distribution may be a mono-population between 1 and 13 nm, or a bi-population with a relative difference between the two populations which may vary from 1 to 20 nm, as in U.S. Pat. No. 6,589,908.

The initial active phase of the catalyst placed in the hydrodesulphurization step is generally constituted by cobalt and molybdenum, as described in U.S. Pat. No. 6,332,976.

Thus, the prior art has shown that it is of vital importance to use a succession of catalysts with different porosities between the HDM section and the HDS section. In fact, the dispersion of the active phase necessitates providing supports with high specific surface areas, but the porosity of the support must also allow the reagents to diffuse readily within it. Thus, there has to be compromise between accessibility of the active phase and the pore size. During hydrorefining of molecules, the size distribution of the reagents changes. In general, the molecule size is smaller in the second section (HDS) than in the first step (HDM), which implies that the mean diameter of the mesopores is higher in the HDM section than in the HDS section. The vast majority of processes follow this rule as can be seen, for example, in patent application US2006/0060509.

Further, the skilled person is aware from patents EP-0 113 297 and EP-0 113 284 that the metals content is higher in the second step than in the first. A catalyst located in the HDM section thus generally has a group VI metals content of less than 20% by weight of the corresponding trioxide according to the description in patents FR-2 867 988 or EP-1 392 431.

In contrast, a catalyst located in the HDS section of a fixed bed residue hydrotreatment process generally comprises a minimum of 10% by weight of group VI metal trioxide according to the description of patent FR-9 613 717 and up to 17% by weight of group VI metal trioxide according to U.S. Pat. No. 4,818,743.

Thus, it can be concluded from the prior art that catalysts based on nickel, molybdenum and possibly dopants such as phosphorus, which are strongly hydrogenating and thereby limit coking on a multimodal or bimodal support and in particular are macroporous, are generally recommended for the HDM section of fixed bed processes for the hydrotreatment of heavy oil cuts (with a boiling point of more than 370° C.). In the second HDS step of such processes, catalysts based on cobalt, molybdenum and possibly phosphorus on monomodal mesoporous supports are favoured since they can reach better degrees of HDS conversion.

The concatenation of these formulations on the supports defined above requires relatively high quantities of active phase (2% to 8% by weight of $MoO_3$ for the HDM section and 10% to 17% by weight of $MoO_3$ for the HDS section), rendering the catalysts expensive.

Surprisingly, the Applicant has discovered that using a unique mixed formulation for both the HDM section and the HDS section, based on several promoters from group VIB and group VIII, can significantly reduce the overall quantity of group VIB element while improving the overall performances of the process. The present invention concerns the definition of the unique formulation which can be used in the various catalytic zones of a fixed bed process for hydroconversion of heavy oil products (boiling point of more than 370° C.).

In one aspect, the invention provides a catalyst comprising at least one metal from group VIB, at least two metals from group VIII one of which is termed the major promoter VIII-1 and the other or others being termed co-promoters VIII-i, where i is in the range 2 to 5, and at least one support constituted by a porous refractory oxide, in which the elements from group VIII are present in proportions defined by the atomic ratio [VIII-1/(VIII-1+ . . . +VIII-i)], said ratio being in the range 0.5 to 0.85.

In a further aspect, the invention provides a process for the hydrotreatment of heavy hydrocarbon feeds comprising at least one hydrodemetallization step and at least one hydrodesulphurization step, and using at least one catalyst in accordance with the invention in each of the hydrodemetallization and hydrodesulphurization steps, in which said catalyst is the catalyst of the invention.

DESCRIPTION OF THE INVENTION

The Applicant has discovered that the elements of the active phase constituting the catalysts charged into the various reactors of a process for the hydrotreatment of heavy hydrocarbon fractions may be combined together such that their content in the HDS section as in the HDM section have the same formulation as defined below and that the performances of a complete catalytic system employed in at least one hydrodemetallization step, at least one hydrodesulphurization step and optionally at least one hydrodeasphalting step are improved over those of the prior art.

The invention describes a catalyst comprising at least one metal from group VIB, at least two metals from group VIII one of which is termed the major promoter VIII-1 and the other or others being termed co-promoters VIII-i, where i is in the range 2 to 5, and at least one support constituted by a porous refractory oxide, in which the elements from group VIII are present in proportions defined by the atomic ratio [VIII-1/(VIII-1+ . . . +VIII-i)], said ratio being in the range 0.5 to 0.85.

The metals from group VIB are advantageously selected from molybdenum and tungsten; preferably, said metal from group VIB is molybdenum.

The metals from group VIII are advantageously selected from iron, nickel and cobalt.

In the remainder of the description, the major metal from group VIII in the formulation of the catalyst is termed the promoter (VIII-1) and the other metals from group VIII (at least one other promoter), in a smaller quantity, are termed co-promoters (VIII-i), in which i is in the range 2 to 5; preferably, i is equal to 2.

In accordance with the invention, the respective quantities of metals from group VIII are such that the atomic ratio [VIII-1/(VIII-1+ . . . +VIII-i)], in which i is in the range 2 to 5 and i is preferably equal to 2, is in the range 0.5 to 0.85, preferably in the range 0.55 to 0.85, more preferably in the range 0.6 to 0.85, and still more preferably in the range 0.65 to 0.85.

The metals from group VIB are advantageously selected from molybdenum and tungsten; preferably, said metal from group VIB is molybdenum, the major promoter (VIII-1) being cobalt or nickel.

In the case in which i is equal to 2, said catalyst comprises a metal from group VIB and two metals from group VIII, the metal from group VIB being molybdenum and the metals from group VIII being nickel and cobalt.

In this case, the major promoter (VIII-1) may advantageously be cobalt or nickel; more preferably, the major promoter (VIII-1) is cobalt.

In accordance with a highly preferred embodiment, the major promoter (VIII-1) is cobalt and the co-promoter (VIII-2) is nickel.

Said atomic ratio is identical whether the catalyst is used in the HDM section or in a HDS section.

The respective quantities of metal or metals from group VIB and metals from group VIII are advantageously such that the atomic ratio of metals from group VIII to metal or metals from group VIB (VIII/VIB) is in the range 0.3:1 to 0.7:1, preferably in the range 0.35:1 to 0.55:1.

This ratio is identical whether the catalyst is used in a HDM section or in a HDS section.

The quantity of metal or metals from group VIB is advantageously in the range 2% to 20% by weight of the trioxide of the metal or metals from group VIB with respect to the total catalyst mass, preferably in the range 3% to 17%, and more preferably in the range 4% to 17% by weight. The sum of the quantities of metals from group VIII is advantageously in the range 0.3% to 5% by weight of oxide of the metals from group VIII with respect to the total catalyst mass, preferably in the range 0.5% to 4%, and more preferably in the range 0.6% to 3.5% by weight.

The catalyst may optionally contain at least one doping element selected from phosphorus and boron.

The quantity of doping element is advantageously in the range 0.1% to 6% by weight of boron trioxide and phosphorus pentoxide with respect to the total catalyst mass, preferably in the range 0.5% to 5% by weight.

In accordance with a highly preferred implementation, the catalyst comprises molybdenum as the metal from group VIB, nickel and cobalt as the metals from group VIII and phosphorus as the doping element.

In accordance with a more preferred implementation, the catalyst comprises molybdenum as the metal from group VIB, cobalt as the major promoter (VIII-1), nickel as the co-promoter (VIII-2) and phosphorus as the doping element.

Advantageously, these quantities of metals and phosphorus vary depending on whether the catalyst is intended for use in a HDM section or in a HDS section.

In particular, when said catalyst is intended for use in a HDM section, said catalyst advantageously comprises a quantity of metal or metals from group VIB in the range 2% to 9% by weight of trioxide of the metal or metals from group VIB with respect to the total catalyst mass, preferably in the range 3% to 7% by weight, and the sum of the quantities of metals from group VIII is advantageously in the range 0.3% to 2% by weight of oxide of the metals from group VIII with respect to the total catalyst mass, preferably in the range 0.5% to 1.5%, more preferably in the range 0.6% to 1.5% by weight.

Preferably, the quantity of major promoter (VIII-1) is in the range 0.25% to 1.7% by weight of oxide of the metals from group VIII with respect to the total catalyst mass and the quantity of co-promoter (VIII-2) is advantageously in the range 0.05% to 1% by weight of oxide of the metals from group VIII with respect to the total catalyst mass.

In this case, said catalyst preferably comprises a metal from group VIB, the metal from group VIB advantageously being molybdenum, and two metals from group VIII, the metals from group VIII being nickel and cobalt; more preferably, the major promoter (VIII-1) is cobalt and the co-promoter (VIII-2) is nickel.

When said catalyst is intended to be used in a HDM section, then preferably said catalyst also advantageously comprises a quantity of doping element selected from phosphorus and boron in the range 0.1% to 2.5% by weight of boron trioxide and phosphorus pentoxide with respect to the total catalyst mass, preferably in the range 0.5% to 2% by weight. Highly preferably, the doping element is phosphorus.

When said catalyst is intended to be used in a HDS section, said catalyst advantageously comprises a quantity of metal or metals from group VIB which is strictly more than 9% and less than 17% by weight of trioxide of the metal or metals from group VIB with respect to the total catalyst mass, preferably in the range 10% to 16% and more preferably in the range 12% to 16% by weight, and the sum of the quantities of metals from group VIII is advantageously strictly more than 2% and less than 5% by weight of the oxide of the metals from group VIII with respect to the total catalyst mass, preferably strictly more than 2% and less than 4%, and more preferably in the range 2.5% to 4% by weight.

Preferably, the quantity of major promoter (VIII-1) is in the range 1% to 4.5% by weight of oxide of the metals from group VIII with respect to the total catalyst mass and the quantity of co-promoter (VIII-2) is advantageously in the range 0.15% to 2.5% by weight of oxide of the metals from group VIII with respect to the total catalyst mass.

In this case, said catalyst preferably comprises a metal from group VIB, the metal from group VIB advantageously being molybdenum, and two metals from group VIII, the metals from group VIII being nickel and cobalt; highly preferably, the major promoter (VIII-1) is cobalt and the co-promoter (VIII-2) is nickel.

Preferably, said catalyst also advantageously comprises a quantity of doping element selected from phosphorus and boron in the range 0.5% to 6% by weight of boron trioxide and phosphorus pentoxide with respect to the total catalyst mass, preferably in the range 1.5% to 5% by weight. Highly preferably, the doping element is phosphorus.

The quantity of phosphorus and/or boron is advantageously such that the atomic ratio of phosphorus plus boron to the metal or metals from group VIB (P+B)/VIB) is in the range 0.1:1 to 1.5:1, and preferably in the range 0.1:1 to 0.7:1.

This ratio is identical whether the catalyst is used in a HDM section or in a HDS section.

The catalyst of the invention advantageously has a total pore volume (TPV) of at least 0.3 ml/g, preferably at least 0.4 ml/g.

In the case in which the catalyst is used in a HDM section, the total pore volume is advantageously at least 0.5 ml/g, preferably at least 0.6 ml/g, and more preferably at least 0.65 ml/g.

In the case in which the catalyst is used in a HDS section, the total pore volume is advantageously at least 0.3 ml/g, preferably at least 0.4 ml/g.

The total pore volume is determined using the mercury pycnometry method. The volumes are measured using the mercury penetration method in which Kelvin's law is applied, which law gives the relationship between pressure, the diameter of the smallest pore into which the mercury penetrates at said pressure, the wetting angle and the surface tension in accordance with the formula:

$$D = \frac{(4 \cdot t \cdot \cos(\theta)) \cdot 10}{P},$$

"d" represents the pore diameter (nm)
t is the surface tension (48.5 Pa)
$\theta$ is the contact angle ($\theta=140°$; and
P is the pressure (MPa)

The catalyst of the invention advantageously has a macropore volume $V_{50nm}$, defined as the volume of pores with a diameter of more than 50 nm, in the range 0 to 40% of the total pore volume, and preferably in the range 0 to 30% of the total pore volume.

In the case in which the catalyst is used in a HDM section, the macropore volume is more than 5%, preferably 10% and more preferably 20% of the total pore volume (TPV). Such a characteristic may advantageously be obtained by a multimodal distribution, as is the case with a so-called "chestnut husk" support or from a support with a bimodal distribution, with the first mode being mesoporous and the second, macroporous.

In the case in which the catalyst is used in a HDS section, the macropore volume is less than 10%, preferably 5%, and more preferably 1% of the total pore volume (TPV).

The catalyst of the invention advantageously has a mesopore volume of at least 0.3 ml/g, preferably at least 0.5 ml/g, whether the catalyst is used in a HDM section or in a HDS section.

The diameter at $V_{meso}/2$, (mean mesopore diameter), the mesopore volume being the volume corresponding to pores with a diameter of less than 50 nm, is advantageously in the range 5 nm to 36 nm, preferably in the range 6 to 20 nm.

In the case in which the catalyst is used in a HDM section, the mesopore diameter is advantageously in the range 10 to 36 nm, preferably in the range 10 to 20 nm.

In the case in which the catalyst is used in a HDS section, the mesopore diameter is advantageously in the range 5 nm to 20 nm, preferably in the range 6 to 15 nm.

The catalyst of the present invention advantageously has a BET specific surface area (SSA) of at least 120 m²/g, preferably at least 150 m²/g. The term "BET specific surface area" means the specific surface area determined by nitrogen adsorption in accordance with the standard ASTM D 3663-78 established from the BRUNAUER-EMMETT-TELLER method described in the periodical "The Journal of the American Chemical Society", 60, 309 (1938).

The support constituted by a porous refractory oxide is advantageously selected from matrices with a strong alumina component, such as alumina or silica alumina, for example. The dopants may be introduced into it. These include silica, titanium or zirconia.

When the matrix contains silica, the quantity of silica is preferably 25% by weight or less with respect to the total weight of the alumina matrix. Preferably, the support is alumina and more preferably cubic gamma alumina.

The catalyst of the present invention is advantageously in the completely or partially sulphurized form.

The catalyst of the present invention may advantageously be obtained using any method which is well known to the skilled person. The support used is formed by extrudates with a diameter which is generally in the range 0.5 to 10 mm, preferably in the range 0.8 to 3.2 mm. Onto these extrudates or before forming by extrusion, all or part of the catalytic metals or a compound of the catalytic metals of the final catalyst may optionally be introduced using any known method, at any stage in the preparation, preferably by impregnation or co-mixing. The conventional impregnation is that termed "dry" which is well known to the skilled person. It may be carried out in a single step using a solution containing all of the constituent elements of the final catalyst, i.e. a solution containing at least one compound of phosphorus or boron, at least two compounds of at least two metals from group VIII of the periodic table of the elements and at least one compound of at least one metal from group VIB.

Advantageous examples of precursors which may be introduced into the solution as a source of the elements from group VIII are: citrates, oxalates, carbonates, hydroxycarbonates, hydroxides, phosphates, sulphates, aluminates, molybdates, tungstates, oxides, nitrates, halides, for example chlorides, fluorides, bromides, acetates or any mixture of the precursors mentioned here. Advantageous examples of the sources of the element from group VI which are well known to the skilled person are: for molybdenum and tungsten: oxides, hydroxides, molybdic acids and tungstic acids and their salts, in particular ammonium salts, ammonium heptamolybdate, ammonium tungstate, phosphomolybdic acid, phosphotungstic acid and their salts. Preferably, oxides or ammonium salts are used such as ammonium molybdate, ammonium heptamolybdate or ammonium tungstate.

The preferred source of phosphorus is orthophosphoric acid, but salts and esters such as alkaline phosphates, ammonium phosphate, gallium phosphate or alkyl phosphates are also suitable. Phosphorous acids, such as hypophosphorous acid, phosphomolybdic acid and its salts, phosphotungstic acid and its salts may advantageously be employed.

The source of boron may be boric acid, preferably orthoboric acid ($H_3BO_3$), ammonium biborate or pentaborate, boron oxide, or boric esters.

The support is generally initially formed and calcined prior to impregnation. Forming may advantageously be carried out by extrusion, pelletization, using the oil drop method, by rotary plate granulation or using any method which is well known to the skilled person. Calcining may advantageously be carried out between 500° C. and 1000° C. in dry or moist air.

A chelating agent which is organic in nature may advantageously be introduced into the solution if the skilled person adjudges it necessary. The product is then generally matured, dried and calcined in an oxidizing atmosphere, for example in air, normally at a temperature of approximately 300° C. to 600° C., preferably in the range 350° C. to 550° C.

Impregnation may also advantageously be carried out in at least two steps. The various elements may thus advantageously be impregnated successively, or one of the elements may also be impregnated in several sequences. One of the impregnations which is carried out may in particular employ an organic compound which the skilled person might wish to introduce in addition to the constituent elements of the final catalyst.

The solution of the constituent compounds of the elements of the final catalyst may advantageously be prepared in an aqueous solvent, but also in a water-organic solvent mixture or in a pure organic solvent. Ethanol or toluene may thus be cited as examples of a non-aqueous solvent. The pH of this solution may be modified by optionally adding an acid.

The present invention is applicable to the case in which one or more of the catalysts should not be calcined. In this case, after impregnation, the catalyst is simply and advantageously dried.

The various catalysts of the invention may advantageously be used in hydrotreatment processes which can convert heavy hydrocarbon feeds containing metals. A desired aim to be achieved by using the catalysts of the present invention is an improvement in the performances in hydrodesulphurization, hydrogenation, hydrodeoxygenation, hydrodearomatization, hydroisomerization, hydrodealkylation, hydrodeasphalting and hydrodemetallization compared with known prior art catalysts.

In a further aspect, the invention provides a catalytic system comprising at least two catalysts in accordance with the invention in which the first catalyst comprises a quantity of metal or metals from group VIB in the range 2% to 9% by weight of trioxide of the metal or metals from group VIB with respect to the total catalyst mass, and the sum of the quantities of metals from group VIII is in the range 0.3% to 2% by weight of oxide of the metals from group VIII with respect to the total catalyst mass and the second catalyst comprises a quantity of metal or metals from group VIB which is strictly more than 9% and less than 17% by weight of the trioxide of the metal or metals from group VIB with respect to the total catalyst mass, and the sum of the quantities of metals from group VIII is strictly more than 2% and less than 5% by weight of oxide of the metals from group VIII with respect to the total catalyst mass, said first and second catalysts having an identical atomic ratio.

The term "first catalyst" means the catalyst which the feed encounters first when the catalytic system is used in a process, the first and second catalysts being the catalysts of the invention described above.

Advantageously, said catalytic system comprises a first catalyst having a macropore volume of more than 5% of the total pore volume (TPV).

Advantageously, said catalytic system comprises a second catalyst having a macropore volume of less than 10% of the total pore volume (TPV).

In a further aspect, the invention provides a process for the hydrotreatment of heavy hydrocarbon feeds, comprising at least one step for hydrodemetallization and at least one step for hydrodesulphurization, employing at least one catalyst with an identical atomic ratio in each of the hydrodemetallization and hydrodesulphurization steps, in which said catalyst is the catalyst of the invention.

The hydrotreatment process of the invention can advantageously be used to treat heavy hydrocarbon fractions containing sulphur-containing impurities and metallic impurities. The selection of a combination of catalysts with the formulation defined above can advantageously maximize the HDM, HDS and optional hydrodeasphalting function.

The feeds treated in the process of the invention are advantageously selected from atmospheric residues, vacuum residues from straight run distillation, deasphalted oils, residues from conversion processes such as those from coking, fixed bed hydroconversion, ebullated bed hydroconversion, or from moving bed hydroconversion, used alone or mixed. These feeds may advantageously be used as is or diluted in a hydrocarbon fraction or a mixture of hydrocarbon fractions which can be selected from products from the FCC process, a light cycle oil (LCO), a heavy cycle oil (HCO), a decanted oil (DO), a slurry, or possibly from distillation, and gas oil fractions, in particular those obtained by vacuum distillation known as vacuum gas oil (VGO). The heavy feeds may thereby advantageously include cuts from the coal liquefaction process, aromatic extracts or any other hydrocarbon cut.

Said heavy feeds generally have more than 1% by weight of molecules with a boiling point of more than 500° C., a Ni+V metals content of more than 1 ppm by weight, preferably more than 20 ppm by weight, an asphaltenes content, precipitated in heptane, of more than 0.05% by weight, preferably more than 1% by weight.

The heavy feeds may advantageously also be mixed with coal in the form of powder, this mixture generally being known as a slurry. These feeds may advantageously be by-products from coal conversion and re-mixed with fresh coal. The quantity of coal in the heavy feed is generally and preferably a ratio of 1:4 (oil/coal) and may advantageously vary widely between 0.1 and 1. The coal may contain lignite, it may be a sub-bituminous coal or it may be bituminous. Any other type of coal is suitable for use in the invention, both in fixed bed reactors and in ebullated bed reactors.

In accordance with the invention, the process comprises at least one step for hydrodemetallization and at least one step for hydrodesulphurization, and thus in total at least two steps, hydrodemetallization and hydrodesulphurization.

In accordance with a preferred implementation, the process comprises in a total of three to eight hydrodemetallization and hydrodesulphurization steps using three to eight catalysts in accordance with the invention and preferably three to five hydrodemetallization and hydrodesulphurization steps using three to five catalysts of the invention. The quantity of group VIB element and the porosity of the catalyst always satisfies the same criteria as those described above and thus depend on the location of the catalyst in the process and the aim as regards selectivity (HDS/HDM).

The process of the invention is advantageously carried out in one to ten successive reactors, the catalysts of the invention advantageously being charged into the same reactor or into separate reactors. Preferably, one to four catalysts in accordance with the invention may be charged into the same reactor. If several catalysts are charged into the same reactor, they may be stacked, separating the catalytic zones or otherwise.

In a preferred implementation, swing reactors, i.e. reactors which operate alternately in which HDM catalysts of the invention are preferably employed, may be used upstream of the unit.

Said HDM catalysts of the invention described above comprise at least one metal from group VIB, at least two metals from group VIII, termed the major promoter VIII-1, and co-promoters VIII-i in which i is in the range 2 to 5, and at least one support constituted by a porous refractory oxide, in which the elements from groups VIII are present in the proportions defined by the atomic ratio [VIII-1/(VIII-1+ . . . +VIII-i)], said ratio being in the range 0.5 to 0.85; preferably, said HDM catalysts may optionally contain at least one doping element selected from phosphorus and boron.

Said catalyst advantageously comprises a quantity of metal or metals from group VIB in the range 2% to 9% by weight of the trioxide of the metal or metals from group VIB with respect to the total catalyst mass, preferably in the range 3% to 7% by weight, and the sum of the quantities of the metals from group VIII is advantageously in the range 0.3% to 2% by weight of the oxide of the metals from group VIII with respect to the total catalyst mass, preferably in the range 0.5% to 1.5%, and preferably in the range 0.6% to 1.5% by weight.

Preferably, the quantity of the major promoter (VIII-1) is in the range 0.25% to 2.2% by weight of the oxide of the metals from group VIII with respect to the total catalyst mass and the quantity of co-promoter (VIII-2) is advantageously in the range 0.05% to 1% by weight of the oxide of the metals from group VIII with respect to the total catalyst mass. In this case, said catalyst preferably comprises a metal from group VIB, the metal from group VIB advantageously being molybdenum, and two metals from group VIII, the metals from group VIII being nickel and cobalt; most preferably, the major promoter (VIII-1) is cobalt and the co-promoter (VIII-2) is nickel.

Preferably, said catalyst also advantageously comprises a quantity of doping element selected from phosphorus and boron in the range 0.1% to 2.5% by weight of boron trioxide and phosphorus pentoxide with respect to the total catalyst mass, preferably in the range 0.5% to 2% by weight. More preferably, the doping element is phosphorus.

The total pore volume of said HDM catalyst is advantageously at least 0.5 ml/g, preferably at least 0.6 ml/g, and highly preferably at least 0.65 ml/g.

The macropore volume of said HDM catalyst is advantageously more than 5%, preferably 10% and more preferably 20% of the total pore volume (TPV).

The mesopore diameter of said HDM catalyst is advantageously in the range 10 to 36 nm, preferably in the range 10 to 20 nm.

In a preferred implementation, the swing reactors are then followed by reactors in series, in which the HDS catalysts of the invention may advantageously be employed.

Said catalyst advantageously comprises a quantity of metal or metals from group VIB which is strictly more than 9% and less than 17% by weight of the trioxide of the metal or metals from group VIB with respect to the total catalyst mass, preferably in the range 10% to 16% and more preferably in the range 12% to 16% by weight, and the sum of the quantities of metals from group VIII is advantageously more than 2% and less than 5% by weight of the oxide of the metals from group VIII with respect to the total catalyst mass, preferably in the range 2% to 4%, more preferably in the range 2.5% to 4% by weight.

Preferably, the quantity of major promoter (VIII-1) is in the range 1% to 4.5% by weight of oxide of the metals from group VIII with respect to the total catalyst mass and the quantity of co-promoter (VIII-2) is advantageously in the range 0.15% to 2.5% by weight of oxide of the metals from group VIII with respect to the total catalyst mass.

In this case, said catalyst preferably comprises a metal from group VIB, the metal from group VIB advantageously being molybdenum, and two metals from group VIII, the metals from group VIII being nickel and cobalt; more preferably, the major promoter (VIII-1) is cobalt and the co-promoter (VIII-2) is nickel.

Preferably, said catalyst also advantageously comprises a quantity of doping element selected from phosphorus and boron which is in the range 0.5% to 6% by weight of boron trioxide and phosphorus pentoxide with respect to the total catalyst mass, preferably in the range 1.5% to 5% by weight. Highly preferably, the doping element is phosphorus.

The total pore volume of said HDS catalyst is advantageously at least 0.3 ml/g, preferably at least 0.4 ml/g.

The macropore volume of said HDS catalyst is advantageously less than 10%, preferably 5%, and still more preferably 1% of the total pore volume (TPV).

The mesopore diameter is advantageously in the range 5 nm to 20 nm, preferably in the range 6 to 15 nm.

In a highly preferred implementation, two swing reactors are used upstream in the unit, advantageously for the HDM. They are advantageously followed by one to four reactors in series, advantageously used for the HDS.

The proportions of the catalysts of the various types used in the catalytic system employed in the process of the invention may advantageously represent 5% of the HDM catalyst and 95% of the HDS catalyst, expressed as the percentage of the total catalytic volume of the unit, to 80% of HDM catalyst and 20% of the total catalytic volume for the HDS catalyst.

In a preferred implementation, the total volume of the HDM catalyst represents 10% to 50% of the total catalytic volume of the unit and more preferably 15% to 40% of the total catalytic volume of the unit, the remainder of the catalytic volume of the unit being occupied by the HDS catalyst or catalysts.

In the case in which more than two catalysts are used, said catalysts are classified as a function of their functionality (HDM or HDS) and their catalytic volume is added for the purposes of the preceding definition. Further, their characteristics agree with those defined above as a function of their classification as a HDM or HDS catalyst.

The process of the invention may advantageously be carried out in a fixed bed with the aim of eliminating metals and sulphur and reducing the mean boiling point of the hydrocarbons. In the case in which the process of the invention is carried out in a fixed bed, the temperature at which it is carried out is advantageously in the range 320° C. to 450° C., preferably 350° C. to 410° C., at a partial pressure of hydrogen which is advantageously in the range 3 MPa to 30 MPa, preferably in the range 10 to 20 MPa, at an hourly space velocity which is advantageously in the range 0.05 to 5 volumes of feed per volume of catalyst per hour, and with a ratio of gaseous hydrogen to liquid hydrocarbon feed which is advantageously in the range 200 to 5000 normal cubic meters per cubic meter, preferably 500 to 1500 normal cubic meters per cubic meter.

The process of the invention may advantageously be carried out in an ebullated bed on the same feeds. In the case in which the process of the invention is carried out in an ebullated bed, the catalyst is advantageously employed at a temperature in the range 320° C. to 450° C., at a partial pressure of hydrogen which is advantageously in the range 3 MPa to 30 MPa, preferably in the range 10 to 20 MPa, at an hourly space velocity which is advantageously in the range 0.1 to 10 volumes of feed per volume of catalyst per hour, preferably in the range 0.5 to 2 volumes of feed per volume of catalyst per hour, and with a ratio of gaseous hydrogen to liquid hydrocarbon feed which is advantageously in the range 100 to 3000 normal cubic meters per cubic meter, preferably 200 to 1200 normal cubic meters per cubic meter.

In accordance with a preferred implementation, the process of the invention is carried out in fixed bed mode.

Before using them in the process of the invention, the catalysts of the present invention preferably undergo a sulphurization treatment in order to at least partially transform the metallic species into the sulphide before bringing them into contact with the feed to be treated. This treatment of activation by sulphurization is well known to the skilled person and can be carried out using any method which is already known and described in the literature. One conventional method for sulphurization which is well known to the skilled person consists of heating the mixture of solids in a stream of a mixture of hydrogen and hydrogen sulphide or in a stream of a mixture of hydrogen and hydrocarbons containing sulphur-containing molecules at a temperature in the range 150° C. to 800° C., preferably in the range 250° C. to 600° C., generally in a traversed bed reaction zone.

The invention thus concerns the steps of hydrodemetallization and hydrodesulphurization, however other transformation steps may advantageously be carried out, either upstream of the hydrodemetallization step or downstream of the hydrodesulphurization step or between the hydrodemetallization and hydrodesulphurization steps. The catalysts used in the HDM section and in the HDS section preserve the properties of the invention.

The following examples illustrate the invention without, however, limiting its scope.

EXAMPLE 1

Preparation of a Support a Forming Part of the Composition of the Catalysts of the Invention We prepared a support A based on alumina in order to be able to prepare catalysts as described in the examples below from the same formed support. To this end, we used a matrix composed of boehmite or alumina gel sold under the trade name Versal 250 by La Roche Chemicals. This gel was mixed with an aqueous solution containing 52.7% nitric acid (1% by weight of acid per gram of dry gel) then mixed for 20 minutes in a Z arm mixer (Aoustin MX2). The paste was then mixed with an aqueous solution containing 20.3% ammonia (40 mol % of ammonia per mole of acid) for 5 minutes in the same mixer. At the end of this mixing, the paste was passed through a die having trilobal orifices with an inscribed diameter of 2.0 mm using a piston extruder (Retma). The extrudates were then dried overnight at 120° C. and calcined at 700° C. for two hours in a stream of moist air containing 200 g of water/kg of dry air.

Cylindrical extrudates with a diameter of 1.6 mm were thus obtained with a specific surface area of 210 m$^2$/g, a total pore volume of 0.95 ml/g, and a mesopore distribution centred on 13 nm (pd at Vmeso/2). This alumina A also contained 0.25 ml/g of pore volume in pores with a diameter of more than 50 nm (macropore volume), i.e. a macropore volume of 26% of the total pore volume.

EXAMPLE 2

Preparation of a Support B Forming Part of the Composition of the Catalysts of the Invention We prepared a support B based on alumina in order to be able to prepare catalysts as described in the examples below from the same formed support. To this end, a matrix composed of tabular boehmite sold under the trade name SB3 by Condea Chemie GmbH was mixed with a solution containing 66% nitric acid (7% by weight of acid per gram of dry gel) then mixed for 15 minutes. After this mixing, the paste obtained was passed through a die having trilobal orifices with an inscribed diameter of 1.5 mm. The extrudates were then dried overnight at 120° C. and calcined at 550° C. for two hours in moist air containing 7.5% by volume of water. Trilobal extrudates with a diameter of 1.3 mm were thus obtained with a specific surface area of 245 m$^2$/g, a total pore volume of 0.65 ml/g, and a mesopore distribution centred on 11 nm. Support B thus had a macropore volume of 0% of the total pore volume.

X ray diffraction analysis revealed that the matrix was composed of only low crystallinity cubic gamma alumina.

EXAMPLE 3

Preparation of a Catalyst C (in Accordance with the Invention)

We carried out dry impregnation of a bimodal support A from Example 1. The aqueous impregnation solution contained salts of molybdenum, nickel and cobalt as well as phosphoric acid ($H_3PO_4$) and hydrogen peroxide ($H_2O_2$). The molybdenum salt was ammonium heptamolybdate $Mo_7O_{24}(NH_4)_6.4H_2O$ and that of nickel (cobalt) was nickel (cobalt) nitrate $Ni(NO_3)_2.6H_2O(Co(NO_3)_2.6H_2O)$. The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 6% by weight, that of nickel oxide was 0.4% by weight, that of cobalt oxide was 0.74% by weight and that of phosphorus pentoxide was 1.2% by weight. The atomic ratio [Co/(Co+Ni)] was equal to 0.65 and the atomic ratio of phosphorus to molybdenum was equal to 0.4. Finally, the atomic ratio (Ni+Co)/Mo was equal to 0.37.

The textural characteristics of catalyst C obtained are given in Table 1.

TABLE 1

Textural characteristics of catalyst C and support A

|  | A | C |
|---|---|---|
| SBET (m$^2$/g) | 210 | 190 |
| TPV (ml/g) | 0.95 | 0.9 |
| Dpvmeso/2 (nm) | 13 | 13.5 |
| $V_{50\,nm}$ (ml/g) | 0.25 | 0.25 |
| $V_{50\,nm}$, % of TPV | 26 | 28 |

EXAMPLE 4

Preparation of a Catalyst D (in Accordance with the Invention)

We dry impregnated the above support A with the characteristics shown in Table 1. The aqueous impregnation solution contained salts of molybdenum, nickel and cobalt as well as phosphoric acid ($H_3PO_4$) and hydrogen peroxide ($H_2O_2$). The molybdenum salt was ammonium heptamolybdate $Mo_7O_{24}(NH_4)_6.4H_2O$ and that of nickel (cobalt) was nickel (cobalt) nitrate $Ni(NO_3)_2.6H_2O(Co(NO_3)_2.6H_2O)$. The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 4.5% by weight, that of nickel oxide was 0.3% by weight, that of cobalt oxide was 0.55% by weight and that of phosphorus pentoxide was 0.9% by weight. The atomic ratio [Co/(Co+Ni)] was equal to 0.65 and the atomic ratio of phosphorus to molybdenum was equal to 0.4. Finally, the atomic ratio (Ni+Co)/Mo was equal to 0.37.

The textural characteristics of catalyst D obtained are given in Table 2.

TABLE 2

Textural characteristics of catalyst D and support A

|  | A | D |
|---|---|---|
| SBET (m$^2$/g) | 210 | 195 |
| TPV (ml/g) | 0.95 | 0.92 |
| Dpvmeso/2 (nm) | 13 | 13 |
| V$_{50\,nm}$ (ml/g) | 0.25 | 0.25 |
| V$_{50\,nm}$, % of TPV | 26 | 27 |

EXAMPLE 5

Preparation of a Catalyst E, not in Accordance with the Invention

We dry impregnated the above support A with the characteristics shown in Table 1. The aqueous impregnation solution contained salts of molybdenum and nickel as well as phosphoric acid (H$_3$PO$_4$) and hydrogen peroxide (H$_2$O$_2$). The molybdenum salt was ammonium heptamolybdate Mo$_7$O$_{24}$(NH$_4$)$_6$.4H$_2$O and that of nickel was nickel nitrate Ni(NO$_3$)$_2$.6H$_2$O. The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 6% by weight, that of nickel oxide was 1.15% by weight, and that of phosphorus pentoxide was 1.2% by weight. Catalyst E contained no cobalt: the atomic ratio [Co/(Co+Ni)] was equal to 0 and the atomic ratio of phosphorus to molybdenum was equal to 0.4. Finally, the atomic ratio (Ni+Co)/Mo was equal to 0.37.

The characteristics of catalyst E obtained are given in Table 3.

TABLE 3

Textural characteristics of catalyst E and support A

|  | A | E |
|---|---|---|
| SBET (m$^2$/g) | 210 | 190 |
| TPV (ml/g) | 0.95 | 0.9 |
| Dpvmeso/2 (nm) | 13 | 13.4 |
| V$_{50\,nm}$ (ml/g) | 0.25 | 0.25 |
| V$_{50\,nm}$, % of TPV | 26 | 28 |

EXAMPLE 6

Preparation of a Catalyst F (in Accordance with the Invention)

We dry impregnated a support B which had no macroporosity and had the characteristics shown in Table 1. The aqueous impregnation solution contained salts of molybdenum, nickel and cobalt as well as phosphoric acid (H$_3$PO$_4$) and hydrogen peroxide (H$_2$O$_2$). The molybdenum salt was ammonium heptamolybdate Mo$_7$O$_{24}$(NH$_4$)$_6$.4H$_2$O and that of nickel (cobalt) was nickel (cobalt) nitrate Ni(NO$_3$)$_2$.6H$_2$O (Co(NO$_3$)$_2$.6H$_2$O). The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 16% by weight, that of nickel oxide was 1.05% by weight, that of cobalt oxide was 1.95% by weight and that of phosphorus pentoxide was 3.2% by weight. The atomic ratio [Co/(Co+Ni)] was equal to 0.65 and the atomic ratio of phosphorus to molybdenum was equal to 0.4. Finally, the atomic ratio (Ni+Co)/Mo was equal to 0.36.

The textural characteristics of catalyst F obtained are given in Table 4.

TABLE 4

Textural characteristics of catalyst F and support B

|  | B | F |
|---|---|---|
| SBET (m$^2$/g) | 245 | 215 |
| TPV (ml/g) | 0.65 | 0.55 |
| Dpvmeso/2 (nm) | 11 | 12 |
| V$_{50\,nm}$ (ml/g) | — | — |
| V$_{50\,nm}$, % of TPV | 0 | 0 |

EXAMPLE 7

Preparation of a Catalyst G (in Accordance with the Invention)

We dry impregnated a support B which had no macroporosity and had the characteristics shown in Table 1. The aqueous impregnation solution contained salts of molybdenum, nickel and cobalt as well as phosphoric acid (H$_3$PO$_4$) and hydrogen peroxide (H$_2$O$_2$). The molybdenum salt was ammonium heptamolybdate Mo$_7$O$_{24}$(NH$_4$)$_6$.4H$_2$O and that of nickel (cobalt) was nickel (cobalt) nitrate Ni(NO$_3$)$_2$.6H$_2$O (Co(NO$_3$)$_2$.6H$_2$O). The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 14% by weight, that of nickel oxide was 0.9% by weight, that of cobalt oxide was 1.7% by weight and that of phosphorus pentoxide was 2.8% by weight. The atomic ratio [Co/(Co+Ni)] was equal to 0.65 and the atomic ratio of phosphorus to molybdenum was equal to 0.4. Finally, the atomic ratio (Ni+Co)/Mo was equal to 0.36.

The characteristics of catalyst G obtained are given in Table 5.

TABLE 5

Textural characteristics of catalyst G and support B

|  | B | G |
|---|---|---|
| SBET (m$^2$/g) | 245 | 220 |
| TPV (ml/g) | 0.65 | 0.55 |
| Dpvmeso/2 (nm) | 11 | 12 |
| V$_{50\,nm}$ (ml/g) | — | — |
| V$_{50\,nm}$, % of TPV | 0 | 0 |

EXAMPLE 8

Preparation of a Catalyst H, not in Accordance with the Invention

We dry impregnated the same support B which had the characteristics shown in Table 1. The aqueous impregnation solution contained salts of molybdenum and cobalt as well as phosphoric acid ($H_3PO_4$) and hydrogen peroxide ($H_2O_2$). The molybdenum salt was ammonium heptamolybdate $Mo_7O_{24}(NH_4)_6.4H_2O$ and that of cobalt was cobalt nitrate $Co(NO_3)_2.6H_2O$. The quantities of each of these salts in solution were determined in order to fix the desired quantity of each element at the support surface.

After maturing at ambient temperature in a water-saturated atmosphere, the impregnated support extrudates were dried overnight at 120° C. and calcined at 500° C. for 2 hours in air. The quantity of molybdenum trioxide was 16% by weight, that of cobalt oxide was 3% by weight and that of phosphorus pentoxide was 3.2% by weight. Catalyst E contained no nickel: the atomic ratio [Co/(Co+Ni)] was equal to 1 and the atomic ratio of phosphorus to molybdenum was equal to 0.4. Finally, the atomic ratio (Ni+Co)/Mo was equal to 0.36.

The characteristics of catalyst H obtained are given in Table 6.

TABLE 6

|  | B | H |
|---|---|---|
| SBET (m²/g) | 245 | 215 |
| TPV (ml/g) | 0.65 | 0.55 |
| Dpvmeso/2 (nm) | 11 | 12 |
| $V_{50\,nm}$ (ml/g) | — | — |
| $V_{50\,nm}$, % of TPV | 0 | 0 |

EXAMPLE 9

Hydroconversion Tests of Oil Residues Using Catalysts C, D, E, F, G, H

Catalysts C, D, E, F, G, H described in Examples 1 to 4 were compared in a test for the hydrotreatment of oil residues in the process of the invention. The feed was constituted by an atmospheric residue (AR) of Middle Eastern origin (Arabian Light). These residues are characterized by a high viscosity (45 mm²/s), high Conradson Carbon Residue (10.2% by weight) and high asphaltenes content (3.2% by weight) and a high nickel content (10.6 ppm by weight), vanadium content (41 ppm by weight) and sulphur content (3.38% by weight). The complete characteristics of the feed are reported in Table 7.

The tests were carried out in a hydrotreatment process in accordance with the invention comprising a HDM step followed by a HDS step, the two steps being carried out in two fixed bed tube reactors disposed in series. The first reactor was charged with HDM catalyst (C, D or E) and the second reactor with hydrodesulphurization catalyst (F, G or H). The first reactor was filled with 400 mL of catalyst and the second with 600 mL of catalyst. The fluid flow (oil residues+hydrogen recycle) was in downflow mode in the reactor. This type of unit is representative of the function of the reactors of a HYVAHL unit for fixed bed residue hydrotreatment.

TABLE 7

| Characteristics of feed used for tests | | |
|---|---|---|
| | | AR Arabian Light |
| Density 15/4 | | 0.9712 |
| Viscosity at 100° C. | mm²/s | 45 |
| Sulphur | % by weight | 3.38 |
| Nitrogen | ppm | 2257 |
| Nickel | ppm | 10.6 |
| Vanadium | ppm | 41.0 |
| Aromatic carbon | % | 24.8 |
| Conradson Carbon Residue | % by weight | 10.2 |
| C7 asphaltenes | % by weight | 3.2 |
| SARA | | |
| Saturates | % by weight | 28.1 |
| Aromatics | % by weight | 46.9 |
| Resins | % by weight | 20.1 |
| Asphaltenes | % by weight | 3.5 |
| Simulated distillation | | |
| IP | ° C. | 219 |
| 5% | ° C. | 299 |
| 10% | ° C. | 342 |
| 20% | ° C. | 409 |
| 30% | ° C. | 463 |
| 40% | ° C. | 520 |
| 50% | ° C. | 576 |
| 80% | ° C. | 614 |
| DS: dist'n residue | % by weight | 57 |

After a step for sulphurization by circulating a gas oil cut supplemented with DMDS in the reactor at a final temperature of 350° C., the unit was operated with the oil residue described above under the operating conditions of Table 8.

TABLE 8

| Operating conditions employed | | |
|---|---|---|
| Total pressure | 15 | MPa |
| Test temperature | 370° | C. |
| Hourly space velocity of residue | 0.2 | $h^{-1}$ |
| Hydrogen flow rate | 1000 | std l · $H_2/l_{feed}$ |

The AR Arabian Light was injected, then the test temperature was raised. After a stabilization period of 300 hours, the hydrodesulphurization and hydrodemetallization (HDM) performances were recorded.

Three catalytic systems were evaluated:

The first was constituted by catalyst C at the top of the reactor (upstream in the direction of fluid movement), representing 40% of the total catalytic volume, with the complement, of catalyst F, being downstream.

The second was constituted by catalyst D at the top of the reactor (upstream in the direction of fluid movement), representing 40% of the total catalytic volume, with the complement, of catalyst G, being downstream.

The third was constituted by catalyst E at the top of the reactor (upstream in the direction of fluid movement), representing 40% of the total catalytic volume, with the complement, of catalyst H, being downstream.

For the three catalytic systems, the performances observed after 300 hours were as follows:

TABLE 4

| HDM performances obtained | | |
|---|---|---|
| Catalysts | HDS (wt %) | HDM (wt %) |
| Catalyst C + catalyst F (40/60) | 88 | 83 |
| Catalyst D + catalyst G (40/60) | 82 | 79 |
| Catalyst E + catalyst H (40/60) | 81 | 76 |

The HDS yield is defined as follows:

HDS (wt %)=((wt % S)$_{feed}$-(wt % S)$_{test}$)/(wt % S)$_{feed}$×100

The HDM yield is defined as follows:

HDM (wt %)=((ppm by wt Ni+V)$_{feed}$-(ppm by wt Ni+V)$_{test}$)/(ppm by wt Ni+V)$_{feed}$×100

It thus appears that a combination of catalysts in accordance with the present invention results in both a better HDS activity but also in a better HDM activity than with comparative prior art catalysts which nevertheless have the same molybdenum content. The degrees of HDS and HDM conversion are in fact better by using the catalytic formulations of the present invention than with a concatenation of NiMo in the HDM section and CoMo in the HDS section, the catalysts containing the same quantities of molybdenum in both situations.

Further, the invention can produce HDM and HDS activities which are as high as with prior art catalysts, but minimizing the quantity of molybdenum. The skilled person will thus be able to use catalysts with a lower metals content and thus with a lower cost.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 08/07.269, filed Dec. 18, 2008 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising at least one metal from group VIB, at least two metals from group VIII one of which is termed the major promoter VIII-1 and the other or others being termed co-promoters VIII-i, where i is in the range of 2 to 5, and at least one support constituted by a porous refractory oxide, in which the elements from group VIII are present in proportions defined by the atomic ratio [VIII-1/(VIII-1+...+VIII-i)], said ratio being in the range of 0.5 to 0.85, and wherein said catalyst comprises a quantity of metal or metals from group VIB in the range of 2% to 9% by weight of trioxide of the metal or metals from group VIB with respect to the total catalyst mass, and the sum of the quantities of metals from group VIII is in the range 0.3% to 2% by weight of oxide of the metals from group VIII with respect to the total catalyst mass.

2. A catalyst according to claim 1, in which the metals from group VIB are selected from molybdenum and tungsten.

3. A catalyst according to claim 1, in which the metals from group VIII are selected from iron, nickel and cobalt, the major promoter (VIII-1) being cobalt or nickel.

4. A catalyst according to claim 1, in which said catalyst comprises a metal from group VIB and two metals from group VIII, the metal from group VIB being molybdenum and the metals from group VIII being nickel and cobalt.

5. A catalyst according to claim 3, in which said catalyst contains at least one doping element selected from phosphorus and boron.

6. A catalyst according to claim 1, in which said catalyst comprises a quantity of metal or metals from group VIB in the range of 2% to 9% by weight of trioxide of the metal or metals from group VIB with respect to the total catalyst mass, and the sum of the quantities of metals from group VIII is in the range 0.3% to 2% by weight of oxide of the metals from group VIII with respect to the total catalyst mass.

7. A catalyst comprising at least one metal from group VIB, at least two metals from group VIII one of which is termed the major promoter VIII-1 and the other or others being termed co-promoters VIII-i, where i is in the range of 2 to 5, and at least one support constituted by a porous refractory oxide, in which the elements from group VIII are present in proportions defined by the atomic ratio [VIII-1/(VIII-1+...+VIII-i)], said ratio being in the range of 0.5 to 0.85 and wherein said catalyst comprises a quantity of metal or metals from group VIB which is strictly more than 9% and less than 17% by weight of trioxide of the metal or metals from group VIB with respect to the total catalyst mass, and the sum of the quantities of metals from group VIII is strictly more than 2% and less than 5% by weight of oxide of the metals from group VIII with respect to the total catalyst mass.

8. A catalytic system comprising at least two serially disposed catalysts each comprising at least one metal from group VIB, at least two metals from group VIII one of which is termed the major promoter VIII-1 and the other or others being termed co-promoters VIII-i, where i is in the range of 2 to 5, and at least one support constituted by a porous refractory oxide, in which the elements from group VIII are present in proportions defined by the atomic ratio [VIII-1/(VIII-1+...+VIII-i)], said ratio being in the range of 0.5 to 0.85 wherein the first catalyst comprises a quantity of metal or metals from group VIB in the range 2% to 9% by weight of trioxide of the metal or metals from group VIB with respect to the total catalyst mass, and the sum of the quantities of metals from group VIII is in the range 0.3% to 2% by weight of oxide of the metals from group VIII with respect to the total catalyst mass and the second catalyst comprises a quantity of metal or metals from group VIB which is strictly more than 9% and less than 17% by weight of the trioxide of the metal or metals from group VIB with respect to the total catalyst mass, and the sum of the quantities of metals from group VIII is strictly more than 2% and less than 5% by weight of oxide of the metals from group VIII with respect to the total catalyst mass.

9. A catalytic system according to claim 8, in which the macropore volume of said first catalyst is more than 5% of the total pore volume (TPV).

10. A catalytic system according to claim 9, in which the macropore volume of said second catalyst is less than 10% of the total pore volume (TPV).

11. A process for the hydrotreatment of heavy hydrocarbon feeds, comprising at least one hydrodemetallization step and at least one hydrodesulphurization step, and employing at least one catalyst with an identical atomic ratio in each of the hydrodemetallization and hydrodesulphurization steps, in which said catalyst is the catalyst according to claim 8.

12. A process according to claim 11, comprising conducting the hydrodemetallization step with a catalyst comprising a quantity of metal or metals from group VIB in the range of 2% to 9% by weight of trioxide of the metal or metals from group VIB with respect to the total catalyst mass, and the sum of the quantities of metals from group VIII is in the range of 0.3% to 2% by weight of oxide of the metals from group VIII with respect to the total catalyst mass and conducting the hydrodesulphurization step with a catalyst comprising a quantity of metal or metals from group VIB which is strictly more than 9% and less than 17% by weight of the trioxide of the metal or metals from group VIB with respect to the total catalyst mass, and the sum of the quantities of metals from group VIII is strictly more than 2% and less than 5% by weight of oxide of the metals from group VIII with respect to the total catalyst mass.

13. A process according to claim 11, in which the feeds have more than 1% by weight of molecules having a boiling point of more than 500° C., a Ni+V metals content of more than 1 ppm by weight, and an asphaltenes content, precipitated in heptane, of more than 0.05% by weight.

14. A process according to claim 13, in which the heavy feeds comprise a mixture of coal in the powder form.

15. A process according to claim 11, in which said process is carried out in a fixed bed, at a temperature in the range of 320° C. to 450° C., at a partial pressure of hydrogen in the range of 3 MPa to 30 MPa, at an hourly space velocity in the range of 0.05 to 5 volumes of feed per volume of catalyst per hour, and with a ratio of gaseous hydrogen to liquid hydrocarbon feed in the range of 200 to 5000 normal cubic meters per cubic meter.

16. A process according to claim 11, in which said process is carried out in an ebullated bed, at a temperature in the range of 320° C. to 450° C., at a partial pressure of hydrogen in the range of 3 MPa to 30 MPa, at an hourly space velocity in the range of 0.1 to 10 volumes of feed per volume of catalyst per hour, and with a ratio of gaseous hydrogen to liquid hydrocarbon feed in the range of 100 to 3000 normal cubic meters per cubic meter.

17. A catalyst according to claim 2, in which the metals from group VIII are selected from iron, nickel and cobalt, the major promoter (VIII-1) being cobalt or nickel.

18. A process according to claim 12, in which the feeds have more than 1% by weight of molecules having a boiling point of more than 500° C., a Ni+V metals content of more than 1 ppm by weight, and an asphaltenes content, precipitated in heptane, of more than 0.05% by weight.

19. A process according to claim 14, wherein said feeds comprise by-products from coal conversion mixed with fresh coal.

20. A process for the hydrotreatment of heavy hydrocarbon feeds, comprising at least one hydrodesulphurization step, in which said catalyst is the catalyst according to claim 7.

21. A catalyst according to claim 1, wherein i is equal to 2.

22. A process for the hydrotreatment of heavy hydrocarbon feeds, comprising at least one hydrodemetallization step in which said catalyst is the catalyst according to claim 1.

* * * * *